No. 749,414. PATENTED JAN. 12, 1904.
M. T. B. WASHINGTON.
COOKING UTENSIL.
APPLICATION FILED AUG. 17, 1903.
NO MODEL.
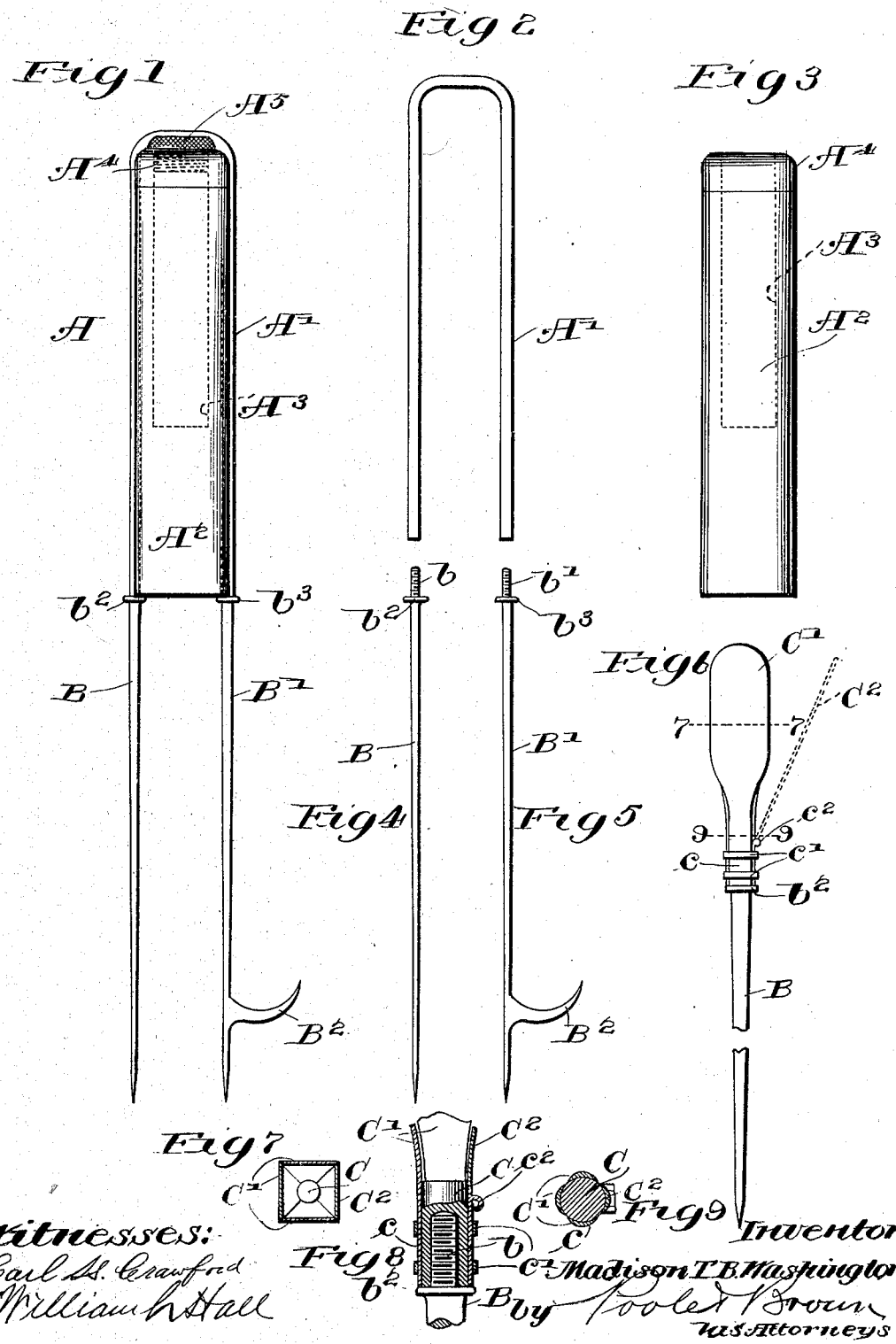
Witnesses:
Carl A. Crawford
William H. Hall
Inventor
Madison T. B. Washington
By Pooler & Brown
his Attorneys No. 749,414. Patented January 12, 1904.

UNITED STATES PATENT OFFICE.

MADISON T. B. WASHINGTON, OF CHICAGO, ILLINOIS.

COOKING UTENSIL.

SPECIFICATION forming part of Letters Patent No. 749,414, dated January 12, 1904.

Application filed August 17, 1903. Serial No. 169,749. (No model.)

*To all whom it may concern:*

Be it known that I, MADISON T. B. WASHINGTON, of Chicago, in the county of Cook and State of Illinois, have invented certain new and useful Improvements in Cooking Utensils; and I do hereby declare that the following is a full, clear, and exact description thereof, reference being had to the accompanying drawings, and to the letters of reference marked thereon, which form a part of this specification.

This invention relates to a novel kitchen or cooking utensil in the nature of a combined meat or game handling fork, a pike, and a larding-needle; and the invention consists in the matters hereinafter set forth, and more particularly pointed out in the appended claims.

In the drawings, Figure 1 is a side elevation of my improved utensil when it assumes the form of a fork. Figs. 2 and 3 illustrate the parts of the handle of the utensil detached one from the other and from the prongs. Figs. 4 and 5 illustrate the prongs of the fork detached from the handle. Fig. 6 illustrates a larding-needle consisting of one of the prongs, to which is attached a head shown in side elevation in said figure. Fig. 7 is a transverse section of the head, taken on line 7 7 of Fig. 6. Fig. 8 is an enlarged fragmentary section taken axially of the stem of the head in a plane at right angles to the plane of Fig. 6. Fig. 9 is a transverse section taken on line 9 9 of Fig. 6.

The device shown in Fig. 1 is primarily a fork and consists generally of a handle A and two prongs B B'. The prong B consists of a straight tapered bar, while the prong B', which is also made tapered, is provided near its pointed end with a barb $B^2$, the whole constituting an article commonly known as a "pike." The handle of the utensil consists of a U-shaped metal frame A' and a filling-piece $A^2$, conveniently made of wood. The arms of said metal frame are arranged parallel with each other and are made hollow at their ends. Said hollow ends of said frame are interiorly screw-threaded, and the prongs B B' are provided with screw-threaded portions $b\ b'$, which are adapted to enter and have screw-threaded engagement with the hollow ends of the frame. Said prongs are provided at the bases of said screw-threaded portions with shoulders $b^2\ b^3$, which constitute stops to limit the inward movement of the prongs in the said hollow frame-arms. The filling-piece $A^2$ of the handle is made of such length as to fill the space between the closed or looped end of the U-shaped frame of the handle and the shoulders or flanges $b^2\ b^3$ at the upper ends of the prongs and is confined from endwise movement between the closed end of the frame and the said flanges or shoulders. The filling-piece is provided with a marginal groove, (indicated in dotted lines in Fig. 1,) which partially receives the frame A'. Said filling-piece is made hollow at its upper end to provide a pocket $A^3$, as shown in dotted lines in Figs. 1 and 4, to receive the larding-head, which will hereinafter be described. Preferably the upper end of said filling-piece consists of a metal head $A^4$, which is made hollow to constitute the upper end of the pocket $A^3$, and the outer end of the opening in said head is closed by a cap $A^5$, which has screw-threaded engagement therewith. The cap and head are so shaped as to fit snugly the closed or looped end of the U-shaped frame of the handle.

The larding-head, which is adapted to be attached to the straight prong B to constitute a larding-needle, is shown in Figs. 6, 7, 8, and 9. As herein shown, said head consists of a short stem C, which is made hollow at its lower end and interiorly screw-threaded to receive the screw-threaded end of said prong B, and a plurality of plates or leaves C' $C^2$, attached to and extending outwardly from the stem. As herein shown, four leaves are provided, three, C', of which are fixed stationary to the stem C, and the fourth one, $C^2$, of which is hinged to swing away from and toward the stationary leaves. The stationary leaves are attached to the stem by being provided with shanks $c$, which are concavo-convex in cross-section and fit upon the cylindric stem C and surround three-quarters of the circumference of said stem. The shanks of said leaves may be attached to the stem in any suitable manner.

As herein shown, they are attached thereto by means of wire bands $c'$, surrounding the shanks. The shank of the fourth leaf $C^2$ is provided with a hinge $c^2$, whereby said leaf $C^2$ may swing toward and away from the stationary leaves, as shown in dotted lines in Fig. 6. The leaves when thus assembled constitute a hollow head open at its outer end, which is adapted to receive a strip of bacon, string of lard, or other material (known as the "larding material") which is adapted to be strung through a steak, game, or other food before it is cooked, the larding material being placed in said head when the leaf $C^2$ is swung away from the head. The manner of stringing said larding material through the steak or other article of food is to place the larding material in the hollow head when the latter is attached to the prong B, thrust said prong, with its pointed end in advance, through the steak, game, or other article of food, and just before the head passes into that side of the steak or other article of food into which the larding-needle is first thrust the larding material contained in said head is grasped by the finger and thumb and the larding-needle is pulled completely through the steak or other article of food and away from the larding material, thereby leading the larding material within the steak or other article of food. In the subsequent cooking of the steak or other article of food the larding material permeates and flavors the article of food, through which it has been strung. The pocket $A^3$ in the filling piece or body of the handle is designed to receive the larding-needle head when the same is not in use and is detached from the prong or needle B, said head being placed in said pocket when the filling piece or body of the handle is detached from the frame. After the larding-head has been placed in said pocket the pocket is closed by the cap $A^5$ and the filling-piece of the handle inserted between the members of the frame. The cap need not necessarily be screw-threaded, as it is held in place by the frame when the parts of the handle are assembled. The screw-threaded connection is preferable, however, as it holds the cap in place when the filling-piece is removed from the handle-frame.

The utensil herein described may be used when assembled as shown in Fig. 1 as an ordinary fork for handling meat, game, and other foods during the process of cooking the same or at other times in the manner of an ordinary fork. Such utensil may also be used as a pike for turning meat while in a dripping-pan or on a broiler or for lifting the same out of a dripping-pan or a pot. When the utensil is to be used as a pike alone, the straight bar or prong may be removed from the utensil and only the pike-prong used. When the use of the larding-needle is desired, the straight prong is removed from the utensil and attached to the head and used in the manner before stated. The leaves $C'$ $C^2$ of the larding-head constitute an open-ended head to receive the larding material, and the head may obviously be otherwise constructed and shaped so long as it is open at its outer end to permit the head to be withdrawn from the larding material when the latter is grasped in the manner before stated. The provision of the hinged leaf $C^2$ is advantageous, however, as it facilitates the placing of the larding material in said head.

The utensil described possesses many practical advantages, as it combines the function of an ordinary fork, a pike, and a larding-needle and obviates the necessity of providing separate utensils for the purpose of serving the several purposes for which such utensils are designed.

I claim as my invention—

1. The utensil described comprising a handle consisting of a U-shaped frame and a filling piece or body fitting between the members of said frame and provided with a pocket, and prongs having detachable engagement with the ends of the parallel members of the frame.

2. The utensil described comprising a handle consisting of a U-shaped frame and a filling piece or body fitting between the members of said frame and provided with a pocket, and prongs having detachable engagement with the ends of the parallel members of the frame, said prongs being provided with shoulders which engage the lower end of the filling piece or body.

3. The utensil described comprising a handle consisting of a U-shaped frame the arms of which are provided with axial screw-threaded sockets and a filling piece or body fitting between the members of said frame and provided with a pocket closed by a cap and prongs having screw-threaded engagement with the ends of said frame members and having shoulders which engage the lower end of said filling piece or body of the handle.

4. The utensil described comprising a handle consisting of a U-shaped frame and a filling piece or body fitting between the members of said frame and provided with a pocket, and prongs having detachable engagement with the ends of the parallel members of the frame, one of said prongs being provided near its outer end with a barb.

5. The utensil described comprising a handle consisting of a U-shaped frame and a filling piece or body adapted to fit between the members of said frame, and provided with a pocket, prongs having screw-threaded connection with the ends of said frame members and a larding-head adapted for screw-threaded engagement with one of said prongs to constitute a larding-needle, said pocket being designed to receive said head when the latter is detached from said prong.

6. A combined fork and larding-needle, said fork having a detachable prong which is adapted for detachable connection with the larding-head, and the handle of the fork being provided with a pocket to receive the larding-head when it is detached from said prong.

In testimony that I claim the foregoing as my invention I affix my signature, in presence of two witnesses, this 6th day of June, A. D. 1903.

MADISON T. B. WASHINGTON.

Witnesses:
WILLIAM L. HALL,
GEORGE R. WILKINS.